United States Patent
Ramfelt

(10) Patent No.: US 6,320,863 B1
(45) Date of Patent: Nov. 20, 2001

(54) BACKPLANE ARCHITECTURE FOR DYNAMIC SYNCHRONOUS TRANSFER MODE

(75) Inventor: Lars Håkan Ramfelt, Palo Alto, CA (US)

(73) Assignee: Dynarc Inc. DBA Dynamic Network Architecture Inc., Mountain View, CA (US)

( * ) Notice: Subject to any disclaimer, the term of this patent is extended or adjusted under 35 U.S.C. 154(b) by 0 days.

(21) Appl. No.: 09/464,032

(22) Filed: Dec. 15, 1999

Related U.S. Application Data

(63) Continuation-in-part of application No. 09/062,524, filed on Apr. 17, 1998, now Pat. No. 6,108,338.

(51) Int. Cl.$^7$ ............... H04L 12/56; H04L 12/43; H04B 7/212
(52) U.S. Cl. ............... 370/404; 370/443; 370/459
(58) Field of Search .................... 370/403, 443, 370/459, 256, 255, 400, 401, 405, 406, 438, 439, 440, 452, 458, 460, 468, 444

(56) References Cited

U.S. PATENT DOCUMENTS

| | | |
|---|---|---|
| 4,542,502 | 9/1985 | Levinson et al. . |
| 4,553,234 | 11/1985 | Brandsma et al. . |
| 4,587,651 | 5/1983 | Nelson et al. . |
| 5,276,682 * | 1/1994 | Van As ............... 370/443 |
| 5,282,199 | 12/1992 | Herzberg et al. . |
| 5,349,582 * | 9/1994 | Bisdikian ............ 370/440 |
| 5,420,986 * | 5/1995 | Baldwin ............. 370/452 |
| 5,551,048 | 6/1994 | Steely, Jr. . |
| 5,654,969 | 6/1994 | Wilhelmson . |
| 5,838,687 | 11/1998 | Ramfelt . |

FOREIGN PATENT DOCUMENTS 0 451 426 B1    11/1994    (EP) .

OTHER PUBLICATIONS

Article: *The DTM Gigabit Network* by Christer Bohm, Per Lindgren, Lars Ramfelt, Peter Sjodin; dated Jun. 17, 1993; pp. 1–20, 22–23.

Article: Fast Circuit Switching for the Next Generation of High Performance Networks; *IEEE Journal on Selected Areas in Communications*, vol. 14, No. 2, Feb. 1996, by Christer Bohm, Markus Hidell, Per Lindgren, Lars Ramfelt, and Peter Sjödin; pp. 298–305.

Article: Multi–gagabit networking based on DTM—A TDM medium access technique with dynamic bandwidth–allocation; *Computer Networks and ISDN Systems 24 (1992) 119–130 North–Holland*; by Lars Gauffin, Lars Håkansson, and Björn Pehrson; pp. 119–130.

Article: Incorporating continuation–of–message information, slot reuse, and fairness in DQDB networks; *Computer Networks and ISDN Systems 24 (1992) 513–169 North Holland*; by Subrata Banerjee and Biswanath Mukherjee; pp. 153–169.

(List continued on next page.)

Primary Examiner—Wellington Chin
Assistant Examiner—Steven Nguyen
(74) Attorney, Agent, or Firm—Fasth Law Offices; Rolf Fasth

(57) ABSTRACT

A backplane for a dynamic synchronous transfer mode network that comprises two dual ring topologies having opposite fiber direction. The ring topologies has a plurality of disjointed segments that permits the simultaneous transmission of signals in the same time slots over the disjointed segments.

11 Claims, 6 Drawing Sheets

OTHER PUBLICATIONS

Article: MetaRing—A Full–Duplex Ring with Fairness and Spatial Reuse; *IEEE Transactions on Communications*, vol. 41, No. 1, Jan. 1993; by Israel Cidon and Yoram Ofek; pp. 110–120.

Article: A Simple Scheme for Slot Reuse Without Latency for a Dual Bus Configuration; by Oran Sharon and Adrian Segall, 1993 IEEE, 9 pages.

Article: A Study of Slot Reuse in Dual Bus Multiple Access Networks by Mark W. Garrett and San–Qi Li; 1990 IEEE, pp. 617–629.

Article: L. Ramfelt; by Manoel A. Rodrigues, ATT&T Bell Laboratories, Holmdel, NJ 07733; 1990 IEEE; pp. 636–643.

* cited by examiner

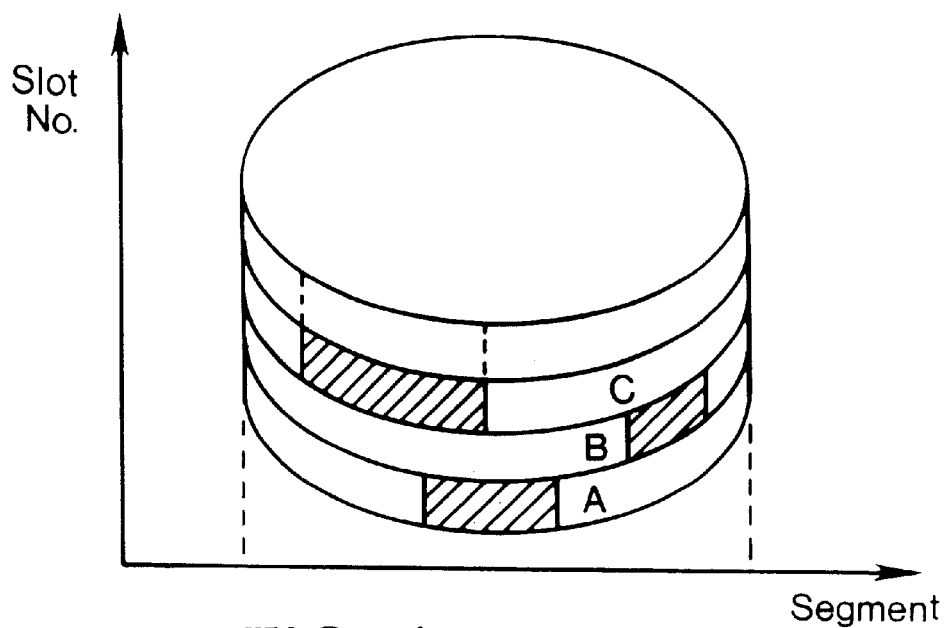
FIG. 4
FIG. 5
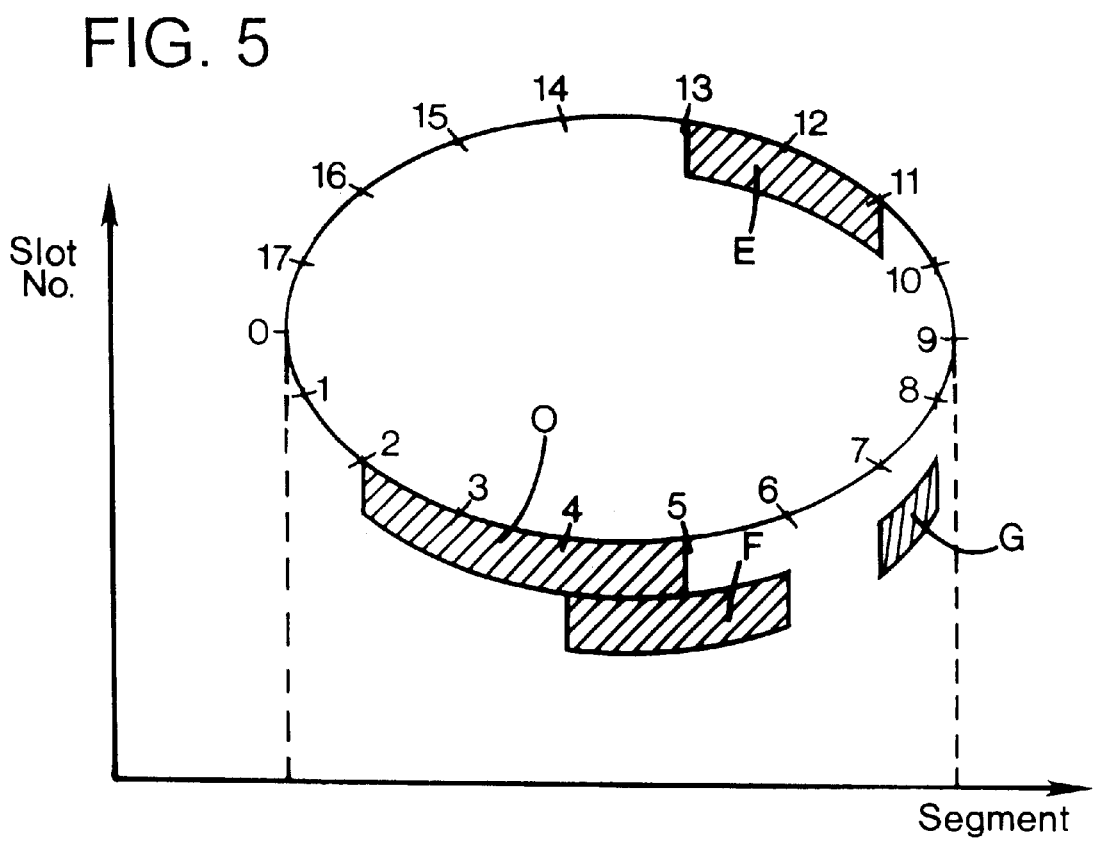

BACKPLANE ARCHITECTURE FOR DYNAMIC SYNCHRONOUS TRANSFER MODE

PRIOR APPLICATION

This application is a continuation-in-part application of U.S. patent application No. 09/062,524; filed Apr. 17, 1998 now U.S. Pat. No. 6,108,338.

TECHNICAL FIELD

The present invention relates to a router/switch architecture based on a dynamic synchronous transfer mode (DTM).

BACKGROUND AND SUMMARY OF THE INVENTION

The next generation of networks are likely to integrate services such as delay-insensitive asynchronous applications including fax, mail, and file transfer with delay-sensitive applications having real-time requirements including audio and video. These applications have traditionally been supported by different network technologies and the integration between the different networks have been limited and cumbersome. In the past, asynchronous communication has been provided by computer networks that are packet-switched and use store-and-forward techniques, like the Internet. Real-time synchronous communication, on the other hand, has been provided by circuit switched, time-division multiplexed telephone networks.

Circuit-switched networks have many attractive features. For example, the circuits are isolated from one another in the sense that traffic on one circuit is unaffected by activities on the other circuits. This makes it possible to provide guaranteed transfer quality with constant delay which often is suitable for applications with timing requirements. Furthermore, information that is related to data and control are separated in circuit-switched networks. Processing of control information only takes place when circuits are created or terminated and the actual data transfer can be performed without the need for processing the data stream and controlling any congestion. This allows large volumes of data to be transferred efficiently.

The static nature of ordinary circuit-switched networks often makes them inappropriate for certain types of information flows. Traditionally, the circuits have fixed capacity, long set-up delay and poor support for multi-cast. These shortcomings make it difficult to efficiently support, for example, computer communication in a circuit-switched network. This has motivated a search for alternative solutions and the predominant view is that the next generation of telecommunication networks should be cell-switched based on asynchronous transfer mode (ATM). Cells are small, fixed-size packets, so ATM is similar to packet-switching. This means that many of the weaknesses of packet-switching are also present in cell-switched networks, particularly in the area of providing guaranteed quality of service. Therefore, additional mechanisms, such as admission control, traffic regulation, scheduling of packets on links and resynchronization at the receiver are needed to integrate support for different kinds of information flows. One of the main concerns with packet and cell switched networks in general, and ATM in particular, is whether it is possible to provide and use these mechanisms in a cost-effective way.

Shared medium local area networks (LANs), such as CSMA/CD, token ring and FDDI, are used in the Internet as building blocks connected by routers or bridges. The combination of easy expansion, low incremental node cost and tolerance to faulty nodes has resulted in simple, flexible, and robust networks. Also, the shared medium facilitates an efficient application of new multi-cast protocols such as IP multi-cast.

A drawback of the shared medium that is used today is that it typically permits only a single terminal to transmit at any time, thereby not utilizing all network segments efficiently. A design that allows the capacity of the medium to be reused may be designed, but this is often at the cost of increased complexity in the high-speed access control hardware. Access control mechanisms for a shared medium also directly depend on the size of the network and are usually efficient only for local area environments.

As indicated earlier, the two main types of networks commonly used are connection oriented circuit-switched networks used for telephones and packet-switched networks without connections that are used for computers, as exemplified by the Internet. When a circuit-switched network is used for data communication, the circuits must remain open between bursts of information which is often a poor use of the network capacity. This problem arises because circuit management operations are slow compared to the dynamic variations in the user demand. Another source of overhead in conventional circuit-switched networks is the limitation of requiring symmetrical duplex channels which add 100% overhead to the network when the information flow is unidirectional. This constraint also makes multi-cast circuits inefficient and difficult to implement. Packet-switched networks, on the other hand, lack resource reservation and must add header information to each message before the transmission is made. Furthermore, any latency in the packet-switched networks cannot be accurately predicted and packets may even be lost due to buffer overflow or corrupted headers. The latter two factors make real-time service difficult to support in packet-switched networks. Congestion avoidance mechanisms can isolate information streams of different users. These designs are, however, limited to time scale operations that are comparable to the round-trip packet delay.

DTM is a broadband network architecture that combines many of the advantages of circuit-switching and packet-switching in that DTM is based on fast circuit-switching augmented with a dynamic reallocation of resources, good support for multi-cast channels and DTM has means for providing short access delay. The DTM architecture spans from medium access, including a synchronization scheme, up to routing and addressing of logical ports at the receiver. DTM is designed to support various types of information flows and can be used directly for application-to-application communication, or as a carrier network for other protocols such as ATM or IP (The Internet Protocol).

It has been shown that the signaling delay associated with the creation and termination of communication channels determines much of the efficiency of fast circuit-switching. DTM is designed to create channels fast, within a few hundreds of microseconds. DTM differs from burst switching in that information related to control and data are separated and DTM uses multi-cast, multi-rate, high capacity channels to support a variety of different classes of information flows. For example, it is possible to increase or decrease the allocated resources of an existing channel depending on the particular requirements of the user at the time. Even though a DTM network may have the potential of creating a channel for every message, this approach may not be suitable for all information flows. Rather, it is up to the user to decide whether to establish a channel per information burst or to keep the channel established even during idle periods.

The DTM concept uses channels as the communication abstraction. The DTM channels differ from telephone circuits in many ways. First, the establishment delay is short so that resources can be allocated/deallocated dynamically as fast as user requirements change. Second, the DTM channels are simplex to minimize the overhead when the communication is unidirectional. Third, the DTM channels offer multiple bit-rates to support large variations in user capacity requirements. Finally, the DTM channels are multi-cast to allow any number of destinations.

The DTM channels require no transfer of control information after a channel is established resulting in a very high utilization of network resources for large data transfers. The support of any real-time information flow is effective and there is no problems related to policing, congestion control or flow-control within the network. As mentioned earlier, the control information is separated from the data information which makes multi-cast less complex. The transmission delay is negligible (i.e., less than 125µs) and there is virtually no potential for data loss caused by buffer overflow as in ATM. Bit-error rates depend on the underlying link technologies, and switches are simple and fast due to the strict reservation of resources at the channel setup.

The DTM topology may be structured as a ring which has the advantage of reducing the hardware requirement with 50% compared to dual bus structures. All nodes are able to communicate with each other on a ring topology by using only one fiber optic in contrast to a bus structure that always require at least two fibers in opposite direction to enable all the nodes to communicate with each other.

More particularly, the present invention is a dynamic synchronous transfer mode router/switch architecture of a high-performance backplane architecture. The backplane has port adapters that are connected to one another as two ring topologies having opposite fiber direction. The ring topologies has a plurality of disjointed segments that permits the simultaneous transmission of signals in the same time slots over the disjointed segments.

BRIEF DESCRIPTION OF THE DRAWINGS

FIG. 4 is a schematic view of a ring topology showing three separate channels;

FIG. 5 is a schematic view of the DTM ring topology of the present invention showing slot reuse of different segments;

DETAILED DESCRIPTION

Figure 1:
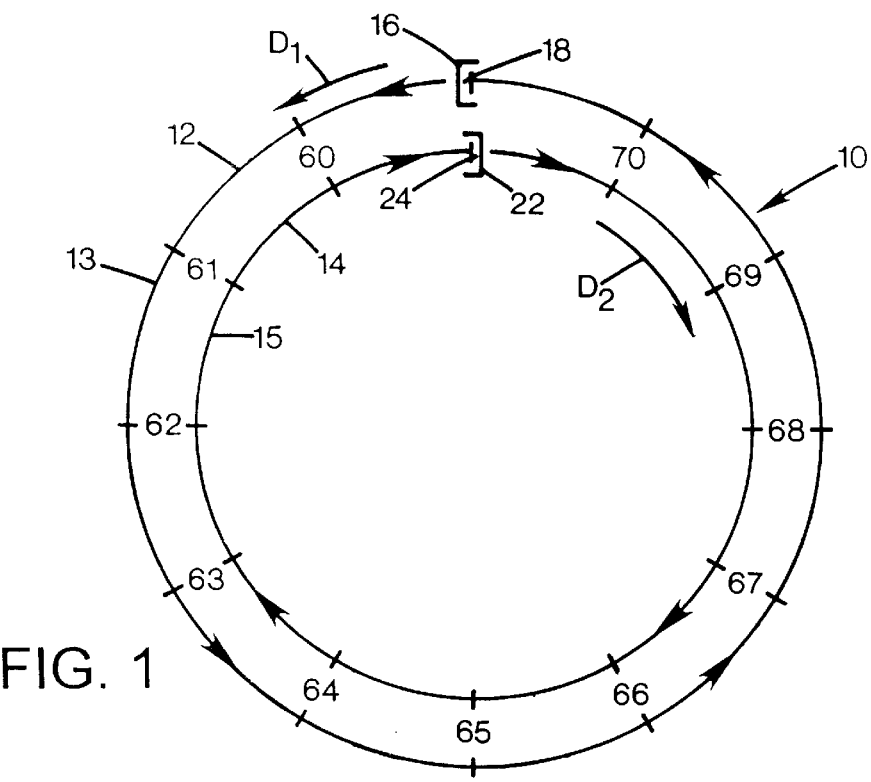
FIG. 1 is a schematic view of a dual DTM ring topology of the present invention.
Figure 2:
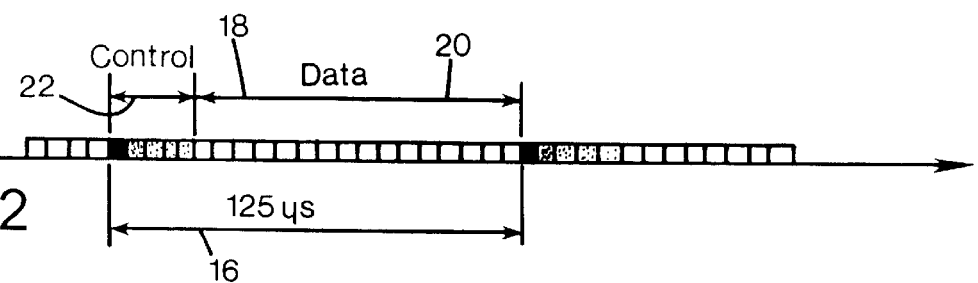
FIG. 2 is a schematic view of a DTM cycle of the present invention having the data time slots separated from the control time slots.

With reference to FIGS. 1–2, the present invention is a dynamic synchronous transfer mode (DTM) ring topology system 10 having a first ring topology 12 and a second ring topology 14. The total capacity of the ring topologies 12, 14 may be divided into cycles of 125 microseconds which are further dividable into 64-bit slots.

One feature of the DTM ring topologies 12, 14 is that the cycle time and the slot length are, preferably, constant throughout the DTM ring topologies 12, 14. The DTM ring topologies 12, 14 are designed for a unidirectional medium with multiple access such as fiber optics medium 13, 15 having a capacity that is shared by all the connected nodes. The slots may be dynamically allocated between the nodes, as required.

The first ring topology 12 is adapted to transfer data in a first rotational direction, as shown by an arrow D1, such as in a counter-clockwise direction, and the second ring topology 14 is adapted to transfer data in a second rotational direction, as shown by an arrow D2, such as in a clockwise direction. It is to be understood that the first rotational direction may be clockwise and the second rotational direction may be counter-clockwise as long as the first fiber direction is different from the second fiber direction. Both the first and second ring topologies 12, 14, preferably, have an effective length that is an integer multiple of 125 microseconds long cycles. As described in detail below, although the actual length of the ring topologies is not an integer multiple of 125 microseconds, the effective length of the ring topologies may be adjusted with expansion nodes.

The first ring topology 12 may comprise an expansion node 16 that may be used to precisely adjust the effective length of the ring topology 12 although the physical length of the ring topology 12 is not an integer multiple of the cycle time. The expansion node 16 may include an expandable buffer segment such as a FIFO (first-in-first-out) queue 18 for storing incoming cycles or frames of time slots. The queue 18 permits a time expansion of the first ring topology 12 to store incoming cycles in the queue 18 a suitable amount of time to optimize the use of the expansion node 16 by permitting the expansion node 16 to generate cycles periodically (every 125 microseconds) into the ring topology independent of the availability of any incoming cycles in the FIFO queue 18 at the transmission time of the new cycle.

The first ring topology 12 preferably has a plurality of nodes 60–70 and at least one of the nodes is selected as the expansion node 16. The method of selecting the expansion node 16 may be performed according to a suitable selection method such as selecting the node that has the highest or the lowest predetermined identification number.

Similarly, the second ring topology 14 preferably comprises an expansion node 22 that may be used to precisely adjust the effective length of the second ring topology 14. The expansion node 22 may include an expandable FIFO queue 24 to optimize the use of the expansion node 22 and to properly synchronize the incoming cycles or frames in the expansion node 22. The second ring topology 14 preferably shares the nodes with the first ring topology 12 although the fiber direction of the second ring topology 14 is opposite that of the fiber direction of the first ring topology 12.

Figure 3:
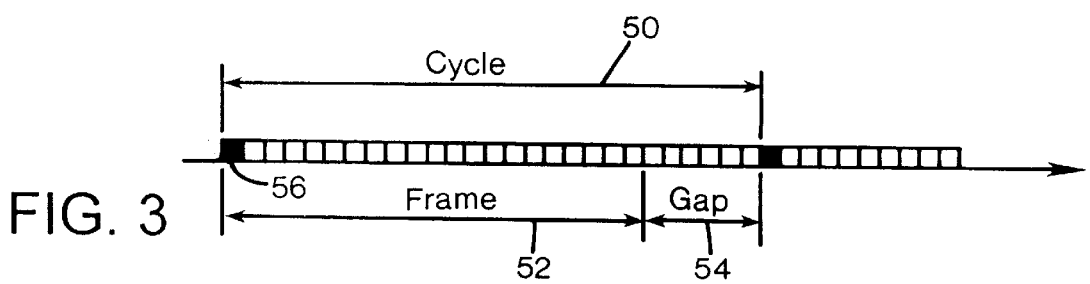
FIG. 3 is a schematic view of a DTM cycle including a frame and gap slots.

FIG. 3 illustrates the details of a complete time cycle 50 that may be defined as an integer number of time slots corresponding to about 125 microseconds. The cycle 50 may be divided into a frame 52 and gap slots 54. The frame 52 may be used to include data slots for carrying pay loads and control slots for carrying control and management messages. It is necessary to include the gap slots 54 in each cycle 50 because each node in the ring topology 10 may not be perfectly synchronized to 125 microseconds and the gap slots 54 may be used to accommodate any variations between the nodes. The gap slots 54 are preferably never used to carry payloads but are only used as an adjustment mechanism. The number of gap slots 54 may be adjusted up or down a few slots so that the average cycle time is very close to 125 microseconds.

In the preferred embodiment, the frame 52 may also include a start slot 56 that is disposed in the beginning of the frame 52 to define the start of a new cycle. In this way, the frame 52 is a fixed number of slots that is slightly less than the total number of slots in the cycle 50.

In general, the service provided by the DTM ring topologies 12, 14 of the present invention are, preferably, based on channels. A channel may be defined as a set of time slots having a sender and an arbitrary number of receivers. The result is that it is guaranteed that the data will reach the receivers at the rate given by the capacity of the channel. The channels on the physically shared medium may be illustrated by a time division multiplexing (TDM) scheme (see FIG. 2). The total capacity of the shared medium may be divided into cycles 26 having a length of 125 microseconds which are further divided into 64-bit slots 28. It is to be understood that other cycles and slot sizes may be used. The transmission medium can, in addition to optical fibers, be a coaxial cable or another medium with high capacity. In the description, the transmission medium will be referred to as an optical fiber.

The time slots are preferably separated into data slots 30 and control slots 32. As described in detail below, each node 60–70 has access to at least one control slot 32 associated therewith that may be used for sending control information to the other nodes in the network. For example, control messages may be sent upon a request from a user and in response to control messages from other nodes or simultaneously for management purposes. The control slots 32 may constitute a small fraction of the total capacity while the major part of the slots are, preferably, data slots 30 for carrying payload information.

All the connected nodes 60–70 and the expansion nodes 16, 22 in the ring topologies 12, 14 share all the available data slots. An important feature of the DTM concept is the time division multiplexing scheme illustrated in FIG. 2. The position of a particular set of slots in the cycles may be used to determine which of the nodes have access to the particular set of slots. In other words, a data slot is always owned by exactly one node at a particular time and only the owner of a data slot at a particular time may use the data slot to send information on a specific segment. If slot reuse is used, then the same slot may be used simultaneously by more than one user but on different segments of the ring topologies 12 ,14.

However, a node may dynamically allocate resources to another node in the ring topologies such as by dynamically allocating a data slot or a set of data slots to another node if the other node needs more slots to fulfill a request. In this way, the ownership of the data slots may vary and is negotiated by the nodes through the control slots 32. In each network node there may be a node controller that controls the access to the data slots and performs network management operations, such as network start-up and error recovery. The main tasks of the node controller are to create and terminate channels on demand from users and to manage network resources in response to user requests. Preferably, control slots are used exclusively for messages between node controllers. As mentioned earlier, each node controller has write access to at least one control slot in each cycle which it uses to broadcast control messages to down-streams nodes. Since write access to control slots is exclusive, the node controller always has access to its control slots regardless of other nodes and network load. The number of control slots a node uses may dynamically vary during network operation.

As mentioned earlier, the majority of the slots in a cycle are data slots. Access to data slots may change over time depending on the requirements of the users connected to the nodes in the ring topologies. Write access to the slots may be controlled by slot tokens (or tokens for short). A node controller may write data into a slot only if it owns the corresponding token. The token protocol guarantees the slot access to be conflict free, which means that not more than one node writes data into the same slot for a specific segment.

Status messages may be used to distribute information about the pool of free tokens available among the nodes in the network. Status message information may be used to assist a node to choose a suitable node when requesting for more resources such as more slots. In this way, each node may regularly broadcasts status information about how many free tokens the node has. The other nodes may store this information in their status tables. A node that requires more capacity may consult its status table to decide from which node to request more slots. The broadcast status information provides an approximate view of the current state of token information so that token requests may be rejected because they were sent to nodes that no longer have tokens to give away.

The DTM system of the present invention permits a multiple access to the data slots depending upon which node has been allocated the slots according to the allocation system used in the network. In this way, the position of the slots in the cycle may be used to determine which node is going to use the data slots and there is no need to include a header in the message.

According to the DTM protocol, when the expansion nodes 16, 22 and nodes 60–70 in the ring topologies 12, 14 read the slots of a frame transmitted by or received from a preceding node, including the expansion nodes 16, 22, the nodes may either copy the information of the slots and send the information to the local user of the particular node and transmit the same information to the next node in the ring topologies 12, 14. If a slot reuse method is used, the nodes 60–70 may also read and copy the information of the slots and send the copied information to the local user and then change the information or write new information into the slots before the frame is forwarded to the next node. Of course, the nodes may neither read or copy the information of a particular node.

As noted above, one important feature of the present invention is that the cycle time is preferably constant to maintain the synchronization of the entire ring topology system 10. Additionally, each cycle has a constant number of slots although each slot in every cycle may or may not contain any information. It is also important to note that it is possible to increase the bit rate per seconds in the fiber optics 13, 15 thereby increasing the number of slots per cycle without losing the synchronization of the ring topologies 12, 14 of the network. It is even possible to connect the ring topology system 10 to another network that runs at a different speed and the synchronization may be maintained if the cycle time and slot length are constant.

If a slot reuse method is used, a single slot may be used multiple times on the ring topologies. Slot reuse enables simultaneous transmissions in the same slot over disjoint segments of the ring topologies 12, 14. Slot reuse may be described as a general method to better utilize shared links in the ring topologies 12, 14.

To allow slot reuse in DTM, the block token format may be extended to include parameters describing the segments it is representing. The token management protocol may also be modified to avoid conflicts in the slot number dimension as well as the segment dimension.

The fact that the first DTM ring topology 12 has a fiber direction that is opposite the fiber direction of the second DTM ring topology 14 improves the capacity of the ring topology system 10. The capacity of the system depends partly on the bit rate per second of the particular fiber optics used. For example, the bit rate per second may be a fixed value such as 1 billion bits per second. Of course, the bit rate per second may be a higher value or a lower value. The higher the bit rate of the fiber optics the more slots per 125 microseconds cycle. As explained in detail below, the actual throughput of the ring topology system 10 may be higher than the bit rate of the fiber optics 13, 15 by reusing slots in the ring topologies 12, 14 in certain segments of the ring topologies. In other words, the same slots may be used by different users in different segments of the ring topologies so that a slot may be used more than once. However, the number of slots per cycle does not increase only the number of times the slots are used to send frames if the number of slots required by the messages or channels exceeds the number of slots in the cycle.

Assuming that both the ring topologies 12, 14 have the same fiber direction, the total capacity of the system 10 is the bit rate of ring topology 12 in addition to the bit rate of the ring topology 14, i.e., the total bit rate is double the bit rate of only one of the ring topologies.

By providing the ring topologies 12, 14 with fiber directions that are opposite to one another, the average distance a frame must travel from a source node to a destination node is reduced to half the average distance of a single ring topology 12. The average travel distance in a single ring topology or a dual ring topology, with the same fiber direction, is half the ring circumference while the average travel distance in a dual ring topology having opposite fiber directions is only one quarter of the ring circumference. By reducing the average distance, the total capacity of dual rings with opposite fiber direction is twice as high as the total capacity of a dual ring where both rings have the same fiber direction.

In this way, a ring topology doubles the capacity compared to a dual bus topology because any source node can reach any destination node. In contrast, a bus topology requires at least two buses, one in each direction, to enable any source node to reach any destination node in the bus topology. A dual ring topology having the same fiber direction doubles the capacity compared to a single ring topology. A dual ring topology with opposite fiber directions doubles the capacity compared to a dual ring topology with the same fiber direction. Therefore, the total capacity of a dual ring topology having opposite fiber directions is eight times higher than a conventional bus topology.

In the dual ring topology system 10 of the present invention, a source node may select the shortest way to a destination node by using the identification number of each node. For example, the shortest way from the source node 61, as shown in FIG. 1, to the destination node 69 is in the clockwise D2 and requires the involvement of at least 4 nodes before reaching the destination node 69 by using the ring topology 14. As indicated above, information may either be transmitted in a clockwise or counter-clockwise direction. The shortest way may be calculated as the smallest value of: a) the chronological number of the destination node (69) minus the chronological number of the source node (61) which equals 8; and b) chronological number of the source node (61) plus the total number of nodes in the ring topology (12) minus the chronological number of the destination node (69) which equals 4. Because 4 is lower than 8, the message will be sent in the D2 direction because that is the shortest way.

As mentioned above, the expansion node 12 or any other node 14 in the ring topology 10 may create a channel by allocating a set of data slots for the channel to each node and by sending a channel establishment control message. The control message may be addressed either to a single node or to a multi-cast group and announces that the channel has been created and what slots are used.

A traditional circuit is often a point-to-point connection between a sender and a receiver. DTM, on the other hand, uses a shared medium which inherently supports multi-cast since a slot can be read by several nodes in a ring topology.

Access delay is the average time from the time that a request arrives to the node until the data transfer starts. It is a measure of the overhead of the channel establishment and includes the time it takes to allocate slots, send a channel establishment message to the receiver and send the first slot of data. In the multi-hop case, the sender waits for a confirmation from the receiver that the channel has been established on both ring topologies before it starts sending data. For the single hop case, the sender alone may create the channel to the receiver and can therefore start sending data as soon as the slots have been allocated.

The access delay consists, when there is a low load condition, mainly of the time it takes for a node to process the transfer request, waiting time for the first available control slot (for the channel establishment message) and then for the first data slot. When the load increases, the nodes have to request slots from other nodes and more delay may be introduced.

Control messages for the channel establishment and bandwidth reallocation may carry sets of tokens as parameters. However, a control message is, preferably, 64 bits and can therefore have only a small number of parameters. This means that if a user requests a large bandwidth transfer, it may be necessary to send several control messages to create the channel. This may introduce extra access delay and consumes signaling capacity. Several mechanisms have been considered to decrease the amount of information that needs to be sent during the channel creation and token reallocation. The first optimization in token management is to introduce block tokens. A block token may be transferred in a single control message and represents a group of tokens, but can only be used for particular combinations of tokens. For instance, a block token may be denoted by a slot number and an offset giving the number of contiguous slots in the group. The block token optimization assumes that the token pool is not fragmented into small pieces. An amount of small token blocks in the free pool may be a problem and will be referred to as fragmentation.

The token protocol guarantees that a data slot can never be used by two nodes simultaneously on the ring topology. Sometimes this protocol is too conservative. FIG. 4 shows an example of how three tokens (A, B, and C) are reserved for three channels. The nodes are connected by segments and channels typically use a subset of the segments on the ring structure (gray color) and the rest are reserved (white color) but left unused and thus wasting shared resources. A better alternative is to let the channels only reserve capacity on the segments between the sender and the receiver as the example illustrated in FIG. 5. A single slot may in this case be used multiple times on the ring topology. Channel D is using the same slots as channel E but on different segments. Similarly, channel F and channel G use the same slots but on different segments. This is referred to as slot reuse. Slot reuse enables simultaneous transmissions in the same slot over disjointed segments of the ring topology. Because the ring topology is round, it is also possible to reserve slots from the end segments to the start segment, such as from segment 16 to segment 2. This is an added feature of ring structures that is not available in single or dual straight bus topologies.

There are additional factors that may influence the utilization in DTM topologies. First, each node is assigned signaling capacity in the form of control slots, which means that there are fewer slots available for data transfer on a ring with many nodes, given a fixed link capacity. Secondly, token reallocation may incur overhead since while a slot token is being reallocated between nodes, the corresponding slot cannot be used for data transfer.

Figure 6:
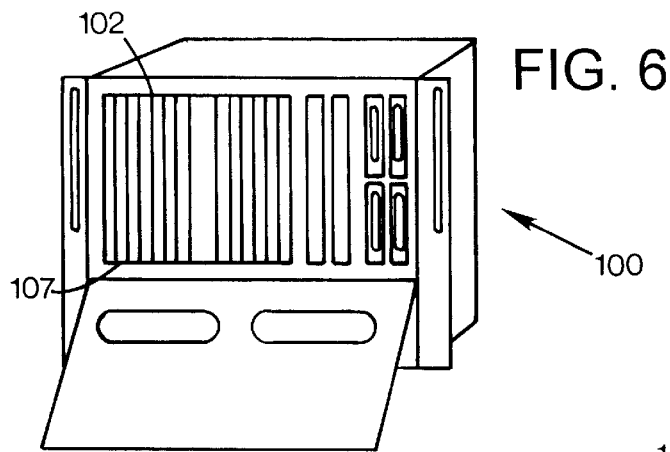
FIG. 6 is a perspective view of the router/switch housing of the present invention.
Figure 7:
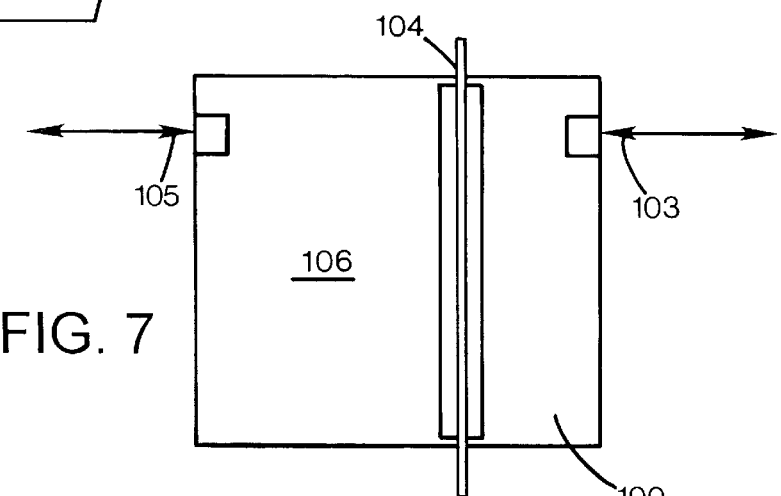
FIG. 7 is a side view of the router/switch housing.
Figure 8:
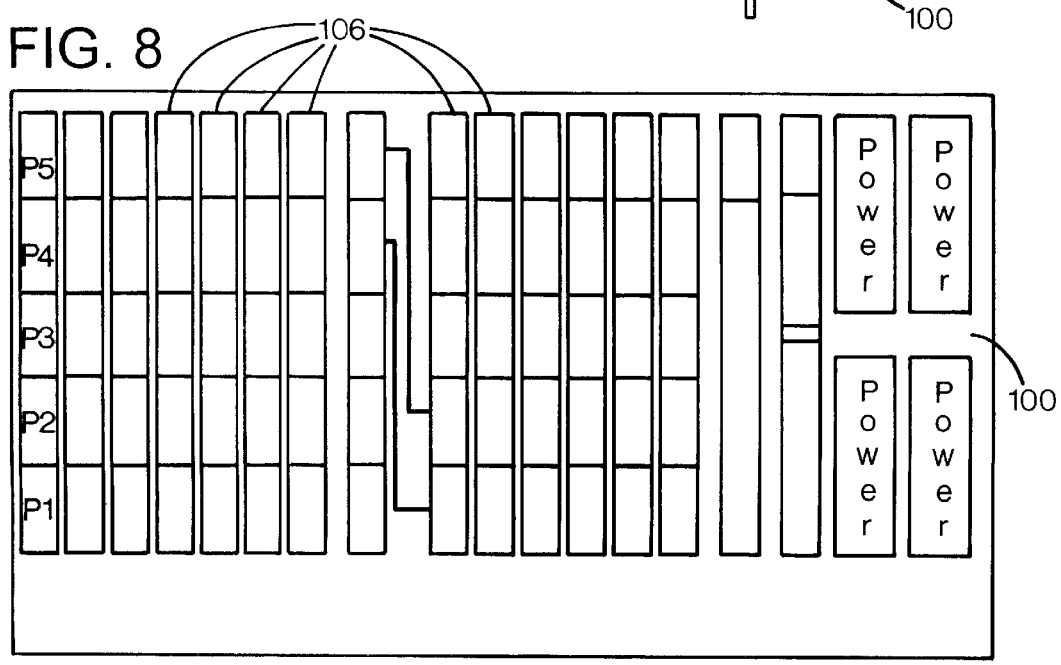
FIG. 8 is a schematic detailed front view of the components inside the router/switch housing.

The above concepts may be modified from a decentralized environment to a centralized environment so that there is a very short distance between the nodes. With reference to FIGS. 6–7, a box or housing 100 containing removable cards that are connected to a router/switch architecture 102 of the present invention is shown. More particularly, the router/switch architecture 102 of the present invention may include a high-performance backplane 104 that is based on DTM. It is to be understood that the backplane may be based on other network concepts such as ATM. Preferably, the architecture 102 may be used as an interface between high capacity backbones, having a capacity ranging from 1 Gbps to 10 Gbps, and long distance lines. For example, each port adapter 106 may be connected to a backplane 104 with a 8 Gbps (10 Gbaud) interface giving the system a total capacity of 32 Gbps. It should be understood that slower and faster interfaces may also be used. Future versions of the backplane 104 may support a performance increase that is twice or four times higher by using faster and/or wider backplane interfaces without modification of the architecture 102. It may also be possible to further increase the performance by using active multistage backplanes. Multistage backplanes provide more capacity without requiring the need to change the port adapter interface.

The architecture 102 may be used for any desirable protocol such as a generic IP (internet protocol) router/switch that may support many different types of port adapters. For example, the architecture may support both asynchronous and synchronous port adapters.

Asynchronous adapters are suitable for forwarding IP and Ethernet packets and may be used to send packets over SDH/SONET, Ethernet at between 100 Mbps and 1,000 Mbps, and asynchronous transfer mode (ATM) such as AAL5/ATM over SDH/SONET. Asynchronous adapters often use large (DRAM) buffers to store packets of information. The adapters may terminate external links, extract packets and then store the packets in queues that may be located on the port adapter cards, such as cards 107 that are removably connected to one of the port adapters 106. The packets may then be forwarded to an output port based on the content of the packets. The forwarding process may be level 2 (Ethernet bridging), level 3 (IP forwarding) and level 4 (QoS, firewall or DTM reservation filter based forwarding). The packet formats that are supported may include IP-packets, Ethernet-packets and DTM-SAR-frames. It is to be understood that other formats may be supported and used also.

Synchronous adapter are suitable for forwarding streams of information including DTM such as 1062.5/1250/2500 Mbaud switch adapters, SDH/SONET path switching adapters, and ATM cell-by-cell hardware forwarding. Synchronous adapters often use small and fast buffers. Incoming and outgoing connections may be perfectly matched in capacity which greatly reduces the cost and complexity of the board. Synchronous adapters also guarantees that data is not dropped or lost on their path through the port adapters 106. The content of the information flow passing a connection may be completely transparent and processed by fast and simple hardware in the port adapters. The architecture 102 may be adapted to simultaneously support both asynchronous and synchronous adapters.

Preferably, the architecture 102 is rack mountable inside the housing 100 which makes it easy to service and minimizes any downtime. The housing 100 may have special EMI shielding and a rear panel I/O 103 and front panel I/O 105 and be in NEBS compliance. Another important feature is that the housing 100 may include hot swap power supplies interface cards that may be removed and replaced during the operation of the backplane.

Figures 9, 10:
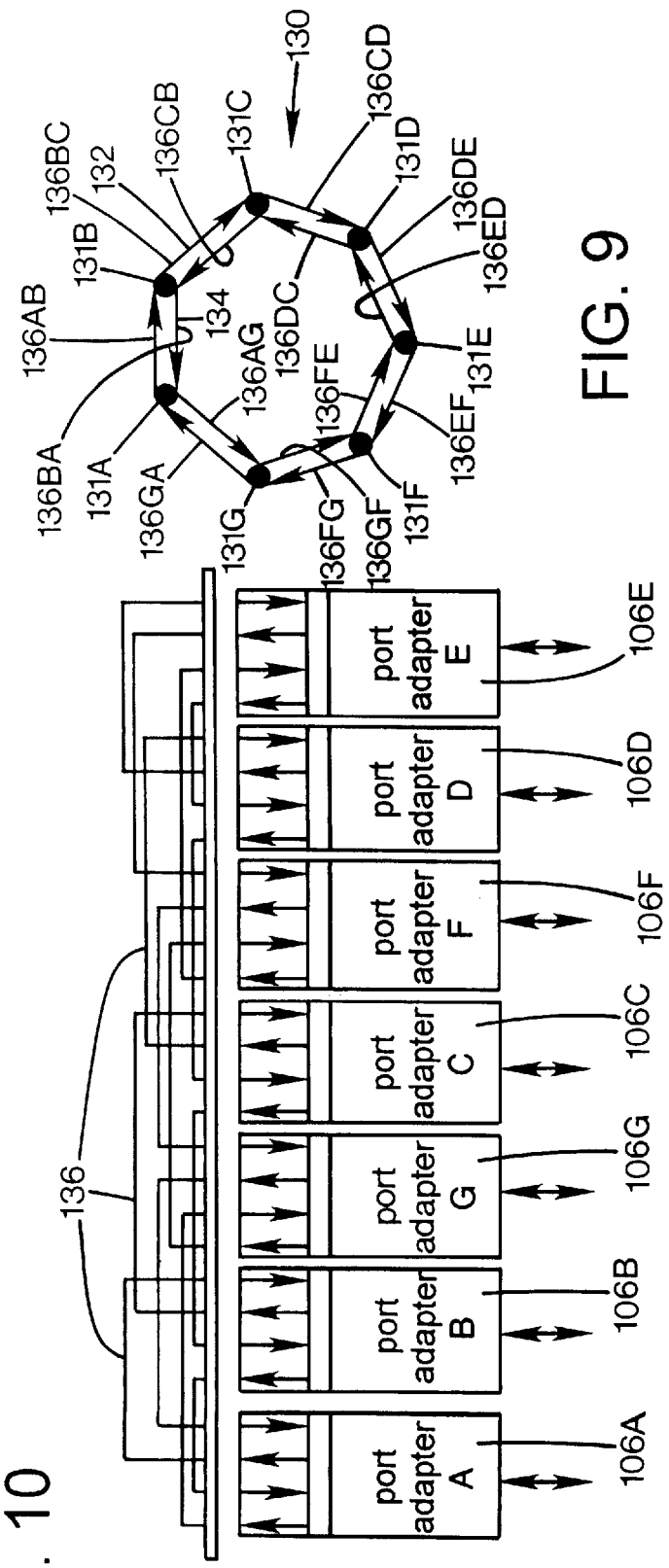
FIG. 9 is a schematic view of a DTM dual ring.
FIG. 10 is a schematic block diagram of DTM port adapters that are connected to one another.

As indicated above, the back plane 104 preferably implements a DTM dual counter-rotating ring topology (as best seen in FIG. 9) and each ring may be operated independently to provide redundancy. The dual ring 130 may include nodes 131A–G and have an outer ring 132 and an inner ring 134. The nodes 131A–G in FIG. 9 corresponds to the port adapters 106A G, respectively, in FIG. 10.

The architecture 102 may used standard serial backplane components to communicate between the cards 107. Each bit-stream in the backplane 104 may operate at 1250 Mbaud and a ring may use four in parallel giving a maximum throughput per card 107 at 10 Gbaud duplex. The maximum data rate per card may be 8 Gbps giving a total system throughput of 32 Gbps. Of course, future versions may used faster/wider backplane interfaces and provide a higher total system capacity.

As best shown in FIG. 10, the adapters 106, that are shown as nodes 131 in FIG. 9, may be connected by wires, such as copper wires 136, or fiber optics. The copper wires are usually less expensive. To reduce any damping and other losses in the copper wires 136, the lengths of the wires should be minimized. In general, the higher the frequency of the signals transmitted in the wires 136, the higher the damping of the signals.

With reference to FIG. 9, the node 131A (which corresponds to the port adapter 106A) may be connected to the node 131B by a wire 136AB on the outer ring 132. The node 131B may be connected to the node 131C by a wire 136BC on the outer ring 132. In a similar fashion, the nodes 131C–131G may be connected to one another by the wires 136CD, 136DE, 136EF, 136FG, respectively, and the node 131G may be connected to the node 131A by a wire 136GA to form the outer ring 132.

The flow direction of the inner ring 134 is preferably opposite to the direction of the outer ring 132 so that the node 131A may be connected to the node 131G by a wire 136AG on the inner ring 134. The node 131G may be connected to the node 131F by a wire 136GF. Similarly, the nodes 131F, 131E, 131D, 131C, 131B and 131A may be connected to one another by the wires 136FE, 136ED, 136DC, 136CB and 136BA, respectively.

One effective way of applying the ring structure as shown in FIG. 9 to the backplane 104 is to use a folded ring structure. The ring structure is folded at the nodes 131A and 131E so that the remaining nodes are lined up in an alternating fashion. For example, the node 131G is placed between the nodes 131B and 131C and the node 131F is placed between the nodes 131C and 131D. As best shown in FIG. 10, the maximum length of the wires 136 is adapters i.e., the wire must only extend over one entire adapter to reach the desired destination adapter. A typical distance is about 800 mil or 0.8 inches between two adapters 106. This means that the distance between two cards 107 connected to the port adapters 106 that have one card disposed therebetween is about 1.6 inches so that the wire 136 should be about 2 inches long.

As indicated above, a typical frequency is about 1 Gbps per wire 136. In the preferred embodiment, differential par devices may be used to electrically reduce any undesired disturbances. However, the use of frequencies of up to 2.5 Gbps and higher are also possible.

The housing 100 may also be connected to other housings such as a housing 142. A conventional single housing is often limited by the width of a 19" rack system which may correspond to about 13 port adapters 106. If the system capacity is 32 Gbps, this means that when using a single port adapter, such as a OC12 POS adapter having a capacity of 0.622 Gbps is used, no more than 13×0.622=8 Gbps data may be forwarded by the adapters in the rack system of the housing 100. By increasing the number of adapters to 50 adapters, the total forwarding capacity increases to about 31 Gbps which is within the above mentioned 32 Gbps capacity. However, more than one housing may be required to provide this capacity.

The architecture 102 of the housing 100 may be connected to other architectures with no degradation of performance. For example, a first dual ring topology 110 may have a first TR/RX interconnector 112 that is connected via a connection medium 114, such as fiber optics, coaxial cable or TP, to a second TR/RX interconnector 116 of a second dual ring topology 118, as best shown in FIG. 11.

Figure 11:
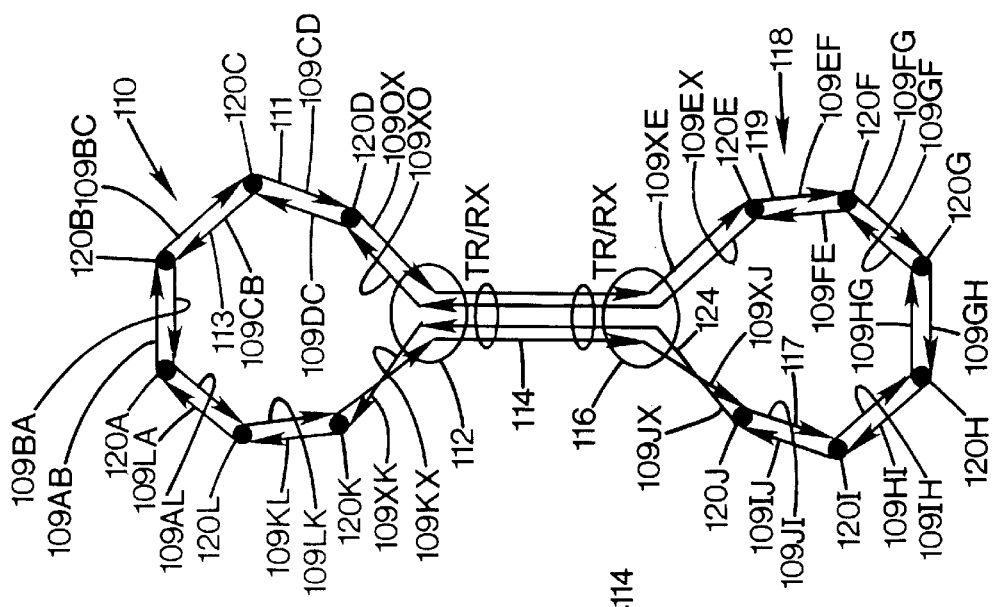
FIG. 11 is a schematic view of two DTM dual rings that are connected to one another.
Figure 12:
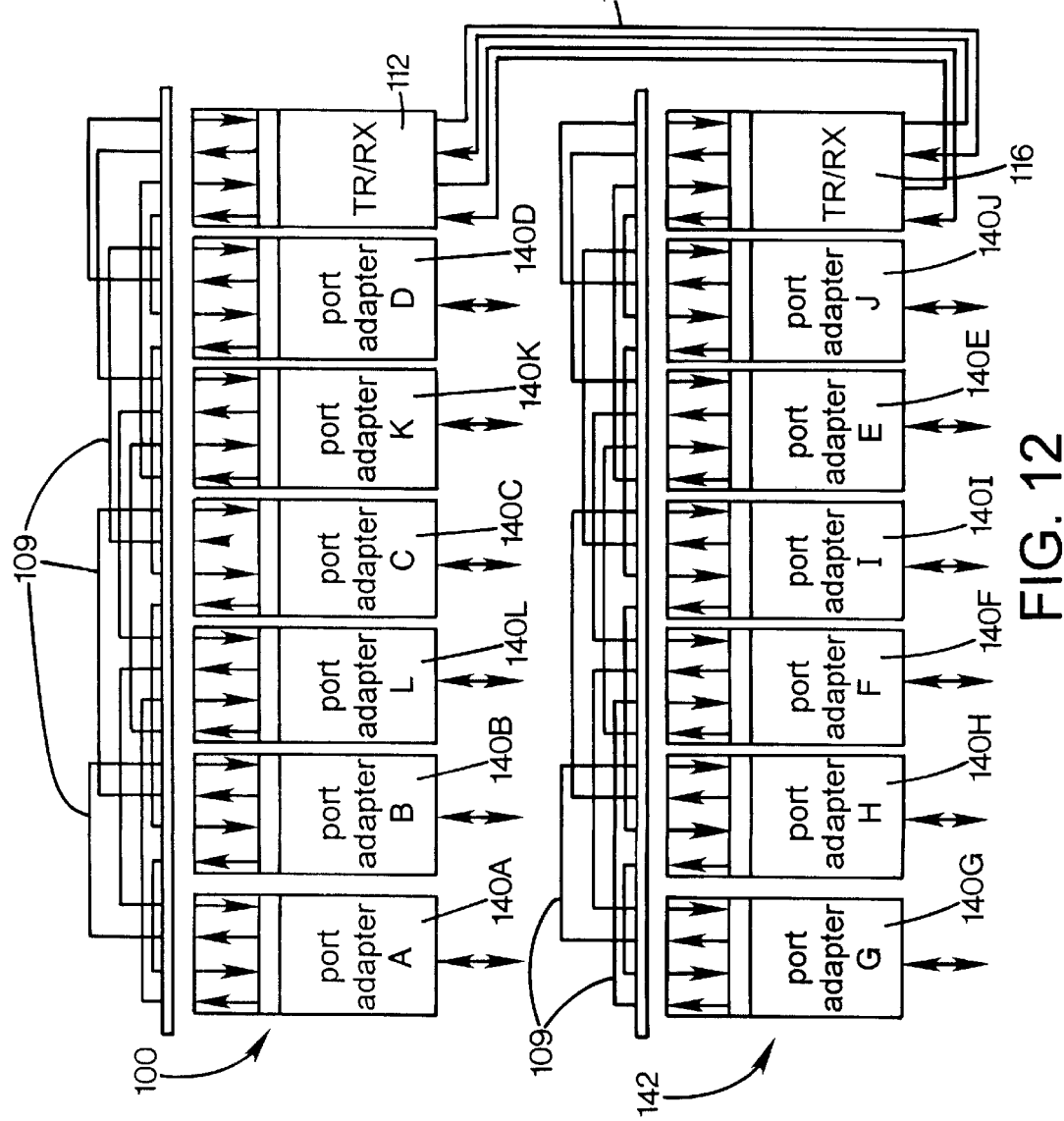
FIG. 12 is a schematic block diagram of DTM port adapters that are connected to one another.

The first and second dual rings 110, 118 may be folded, as described in detail below, to minimize the wire length required to interconnect the port adapters 140A, B, L, C, K, D, G, H, F, I, E, J, as shown in FIG. 12. It is to be understood that each node 120 in FIG. 11 is associated with a corresponding port adapter in FIG. 12.

With reference to FIG. 11, a signal may be transmitted from the node 120A to the node 120B on an outer ring 111 via a wire segment 109AB. Similarly, the signal may be forward from the node 120B to the node 120D via wire segments 109BC and 109CD, respectively. The node 120D may transmit the signal via a wire segment 109DX to a TR/RX interconnector 112 that, in turn, may transmit the signal via the medium 114 to a TR/RX interconnector 116 of the second dual ring 118. The medium 114 may be fiber optics or any other suitable medium.

The interconnector 116 may forward the signal to the node 120E via a wire 109XE that is part of the outer ring 119 of the dual ring 118. In this fashion, signals may be transmitted on the outer ring 119 of the second dual ring 118 via the nodes 120E, F. G, H, I, J and back to the interconnector 116 via the wires 109XE, EF, FG, GH, HI, IJ and JX, respectively on the outer ring 119.

The interconnector 116 may transmit the signal back to the interconnector 112 via the medium 114. The interconnector may transmit the signal to the nodes 120K, 120L, etc., via the wire segments 109XK, KL, etc., on the outer ring 111.

Preferably, the inner rings 113, 117 have a flow direction that is opposite the flow direction of the outer rings 111 and 119. More particularly, a signal may be sent from the node 120A via the wire 109AL to the node 120L. The node 120LK may forward the signal via the wires 109LK, 109KX to the connector 112, respectively. The connector 112 may then forward the signal to the node 120J of the second ring 118 via the medium 114, connector 116 and the wire 109XJ. In a similar fashion, the signal may be transmitted around both inner rings 117 and 113. Of course, the signal may be transferred from one of the inner rings 113, 117 to the outer rings 111, 119, respectively, at one of the nodes, as desired. The signal may also be transferred from one of the outer rings 111, 119 to the inner rings 113, 117, respectively, at one of the nodes.

FIG. 12 illustrates the schematic flow as shown in the two dual rings of FIG. 11 but the nodes 120A–L correspond to the port adapters 140A–L. The port adapters are arranged to minimize the length of the wires 109, as described above, so that the maximum length of the wires 109 is no longer than the distance between two port adapters that have a port adapter placed therebetween. More particularly, the dual rings 110 and 118 are collapsed along node 120A and 120D, and 120G and 120J, respectively, so that the nodes may be line up along the back plane in an alternating fashion, as shown in FIG. 12.

Figure 13:
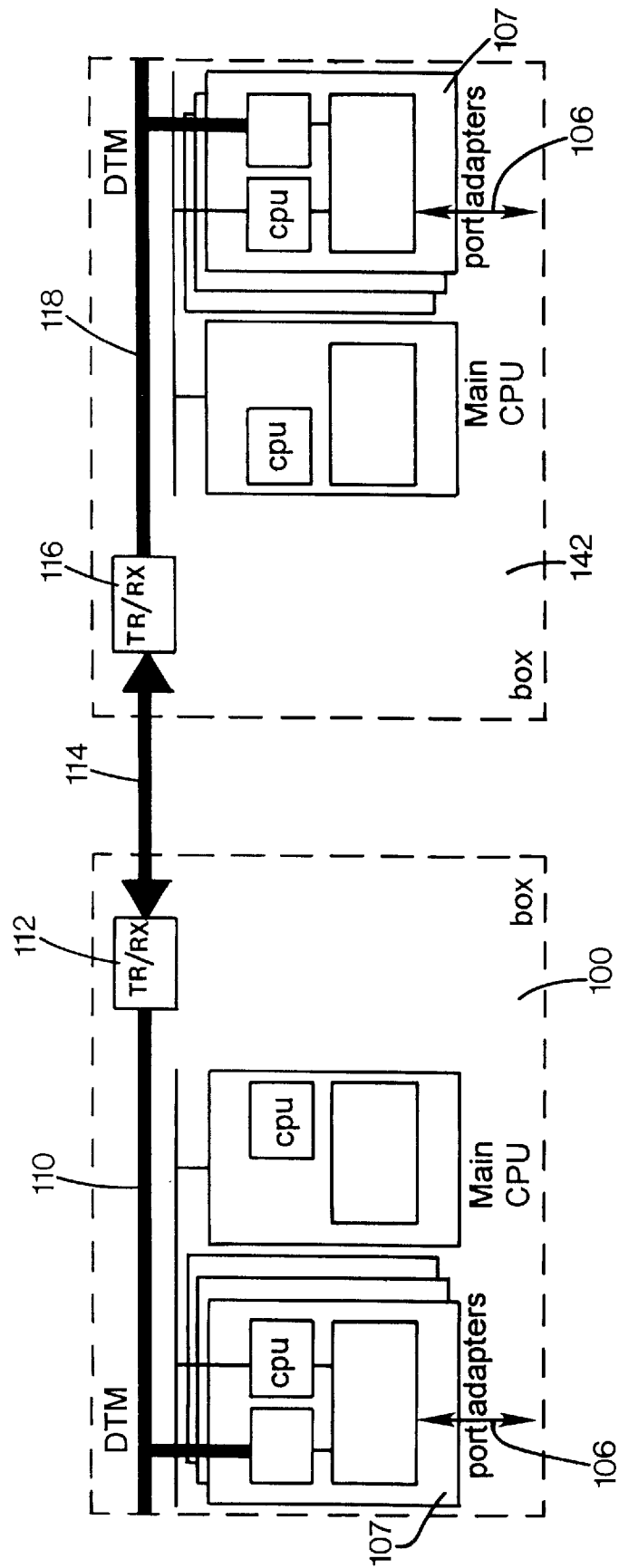
FIG. 13 is a schematic block diagram showing the interaction of the DTM architecture between two router/switch housings.

FIG. 13 is a schematic illustration of how the two DTM rings 110 and 118 are interconnected between the two housings 100 and 142. The housings each has cards 107 that are plugged into the port adapters 106.

While the present invention has been described with reference to preferred embodiments, it is to be understood that certain substitutions and alterations may be made thereto without departing from the spirit and scope of the invention as set forth in the appended claims.

I claim:

1. A backplane architecture for dynamic synchronous transfer mode network, comprising:
   a backplane;
   a first connector, a second connector, a third connector and a fourth connector in operative engagement with the backplane, the connectors being connected to one another as a first dynamic synchronous transfer mode ring topology having a first node in operative engagement with the first connector, a second node in operative engagement with the second connector, a third node in operative engagement with the third connector and a fourth node in operative engagement with the fourth connector for receiving and transmitting frames on the back plane, the first ring topology using time division multiplexing of time cycles that are dividable into time slots, the first ring topology being adapted to transmit frames only in a first fiber direction;
   a second dynamic synchronous transfer mode ring topology having the first node, the second node, the third node and the fourth node in common with the first ring topology, the second ring topology being adapted to transmit frames only in a second fiber direction that is opposite the first fiber direction; and a first segment in the first ring topology extending from the fourth node to the first node;

a second segment in the first ring topology extending from the second node to the third node so that the second segment is disjointed from the first segment;

an extended DTM block token format describing the first and second segments; and the fourth node being arranged to reserve block token capacity only on the first segment and the second node being arranged to reserve block token capacity only on the second segment to permit a simultaneous transmission in the same time slot over the first and second disjointed segments.

2. The backplane architecture according to claim 1 wherein the connectors comprise port adapters.

3. The backplane architecture according to claim 2 wherein the port adapters are connected to one another by wires so that the port adapters form the first and second ring topologies.

4. The backplane architecture according to claim 3 wherein the port adapters are sequenced on the backplane so that no wire completely extends over more than one port adapter.

5. The backplane architecture according to claim 1 wherein the first connector and the second connector are connected to both the first ring topology and the second ring topology so that the first connector and the second connector are capable of receiving and transmitting frames on both the first ring topology and the second ring topology.

6. The backplane architecture according to claim 1 wherein the first ring topology and the second ring topology has a combined throughput and the first ring topology has a first capacity, the combined throughput is four times greater than the first capacity.

7. A method of transmitting frames on a backplane architecture, comprising:

providing a backplane comprising a first dynamic synchronous transfer mode ring topology having a first connector in operative engagement with a first node, a second connector in operative engagement with a second node, a third connector in operative engagement with a third node and a fourth connector in operative engagement with a fourth node, the first ring topology having a time division multiplexing capacity of time cycles being dividable into time slots, the first ring topology having a first inner ring and a first outer ring, the first inner ring transmitting frames only in a first fiber direction, the first outer ring transmitting frames only in a second direction that is opposite the first direction; the first inner and outer ring topologies comprising a plurality of disjointed segments;

the second node requesting a first set of time slots from the first node to transmit the first set of time slots in a first segment extending between the second node and the third node;

the first node allocating the first set of time slots to the second node the fourth node requesting the first set of time slots from the first node to transmit the first set of time slots in a second segment extending between the fourth node and the first node, the second segment being disjointed from the first segment; and transmitting a throughput simultaneously in the same first set of time slots over the disjointed first and second segments.

8. The method according to claim 7 wherein method further comprising connecting the third connector to a second dynamic synchronous transfer mode ring topology having a second inner ring and a second outer ring.

9. The method according to claim 8 wherein the method further comprises connecting the first inner ring with the second inner ring and the first outer ring with the second outer ring.

10. A backplane architecture for dynamic synchronous transfer mode network, comprising:

a first backplane;

a first connector, a second connector, a third connector and a fourth connector in operative engagement with the first backplane, a second back plane;

a fifth connector, a sixth connector, a seventh connector and a eighth connector in operative engagement with the second back plane;

the third connector of the first backplane being in operative engagement with the fifth connector of the second back plane;

the connectors being connected to one another as a first dynamic synchronous transfer mode ring topology having a first node in operative engagement with the first connector, a second node in operative engagement with the second connector, a third node in operative engagement with the third connector, a fourth node in operative engagement with the fourth connector, a fifth node in operative engagement with the fifth connector, a sixth node in operative engagement with the sixth connector, a seventh node in operative engagement with the seventh connector and an eighth node in operative engagement with the eighth connector for receiving and transmitting frames on the first backplane and the second backplane, the first ring topology using time division multiplexing of time cycles that are dividable into time slots, the first ring topology being adapted to transmit frames only in a first fiber direction;

a second dynamic synchronous transfer mode ring topology having the first node, the second node, the third node, the fourth node, the fifth node, the sixth node, the seventh node and the eighth node in common with the first ring topology, the second ring topology being adapted to transmit frames only in a second fiber direction that is opposite the first fiber direction; and a first segment in the first ring topology extending from the fourth node to the first node;

a second segment in the first ring topology extending from the second node to the third node so that the second segment is disjointed from the first segment;

an extended DTM block token format describing the first and second segments; and the fourth node being arranged to reserve block token capacity only on the first segment and the second node being arranged to reserve block token capacity only on the second segment to permit a simultaneous transmission in the same time slot over the first and second disjointed segments.

11. The backplane architecture according to claim 10 wherein the third connector is connected to the fifth connector by fiber optics.

* * * * *